United States Patent [19]

Yamamoto

[11] Patent Number: 4,865,350

[45] Date of Patent: Sep. 12, 1989

[54] VEHICLE SUSPENSION SYSTEM

[75] Inventor: Tadanobu Yamamoto, Higashi-Hiroshima, Japan

[73] Assignee: Mazda Motor Corporation, Hiroshima, Japan

[21] Appl. No.: 175,162

[22] Filed: Mar. 25, 1988

[30] Foreign Application Priority Data

Mar. 26, 1987 [JP] Japan .................................. 62-72576

[51] Int. Cl.$^4$ ............................................. B60G 3/00
[52] U.S. Cl. .................................. 280/716; 280/661; 280/675; 280/688
[58] Field of Search .............. 280/704, 716, 688, 690, 280/701, 725, 675, 661

[56] References Cited

U.S. PATENT DOCUMENTS

| 4,245,853 | 1/1981 | Inoue et al. | 280/701 |
| 4,595,216 | 6/1986 | Wake | 280/673 |
| 4,621,830 | 11/1986 | Kanai | 280/716 |
| 4,714,132 | 12/1987 | Hattori et al. | 180/312 |
| 4,722,544 | 2/1988 | Weber | 280/716 |
| 4,723,791 | 2/1988 | Miura et al. | 280/716 |

FOREIGN PATENT DOCUMENTS

| 0040544 | 11/1981 | European Pat. Off. . |
| 1233736 | 2/1967 | Fed. Rep. of Germany . |
| 56-47008 | 11/1981 | Japan . |
| 59-966 | 1/1984 | Japan . |
| 61-48808 | 4/1986 | Japan . |

Primary Examiner—Richard A. Bertsch
Attorney, Agent, or Firm—Fleit, Jacobson, Cohn, Price, Holman & Stern

[57] ABSTRACT

A rear suspension system comprising a rear differential gear mechanism for transmitting a driving force to rear wheels through rear axles, a suspension support member for supporting the rear differential gear mechanism, a pair of front lateral links extending horizontally and transversely, and a pair of rear lateral links extending horizontally and transversely at rear positions of the front lateral links respectively. The inner end of each of the lateral links is swingably connected to the suspension support member, and the outer end of each of the lateral link is connected to a wheel carrier for carrying the wheel. The suspension system further comprises elastic devices mounted between a vehicle body and the suspension support member. The elastic devices have respective load-deformation properties for upward and downward deformations so as to obtain both stable drivability in a braked turning operation and running safety in a driven turning operation.

14 Claims, 6 Drawing Sheets

VEHICLE SUSPENSION SYSTEM

BACKGROUND OF THE INVENTION

1. Field of the Invention

The present invention relates to a vehicle suspension system and more particularly to a rear suspension system in which a toe direction control of the wheels can be accomplished by a unique structure thereof including support members, lateral links and the like.

2. Prior Art

A suspension system is employed for a motor vehicle so as to prevent the vibration of the wheels from transmitting to the vehicle body or passengers. For this purpose, in Japanese Patent Publication No. 56-47008 published on Nov. 6, 1981 for opposition, there is disclosed a suspension system in which a suspension support structure is provided with a bush of a unique structure mounted between a vehicle body and a suspension support member for improving a vibration absorbing effect. The bush of the suspension system is adapted to be compressed in the up and down direction so as to absorb a vibration of the wheel wherein the coefficient of elasticity of the bush is changed in accordance with the amount of the deformation thereof.

In a motor vehicle, it has been known to provide a suspension system for controlling a toe direction of a wheel. For instance, U.S. Pat. No. 4,245,835 discloses a rear suspension system for suppressing a toe-out movement of the wheel during a turning operation of the vehicle so as to obtain a driving stability. The suspension system disclosed in the Japanese Utility Model Publication No. 59-966 is provided with a tension rod extending longitudinally and two lateral arms extending transversely, one ends of the rod and arms being connected to a suspension support member and the other ends of the rods and arms being connected to a vehicle body.

The lateral arms are connected to the suspension support member through an elastic bush in such a manner that a toe-in movement of the wheel is produced when a side force acts on the wheel.

Further, in Japanese Utility Model Public Disclosure No. 61-48808 laid open to the public on Apr. 2, 1986, there is disclosed a suspension system in which link members are connected swingably in the up and down direction with opposite ends of a suspension cross member at one ends thereof respectively and the other ends of the link members are connected to the right and left wheels respectively. In the disclosed suspension system, the suspension cross member is connected with a vehicle body through a pair of elastic shock absorbing members having different elasticities which are positioned so as to be spaced from each other in the longitudinal direction of the vehicle. The shock absorbing member of the front side is smaller in rigidity than the rear side shock absorbing member so that a toe-in movement is produced in the wheel when a side force acts on the wheel.

Meanwhile, in the case where the toe direction control is accomplished by utilizing a suspension system, when the vehicle is in a braked turning operation in which an engine brake is operated so as to brake drive wheels, it is desirable to suppress a toe-out trend of the outer wheel in the turning curve so that it is as low as possible to provide stability in the braked turning operation. Also when the vehicle is in a driven turning operation, in which the drive wheels are driven by a driving force transmitted from the engine, it is preferable to restrict any toe-direction change in the outer wheel so that it is as low as possible to provide driving stability.

It should be noted, however, that the conventional suspension system can not accomplish a proper toe-control in the braked and driven turning operations.

SUMMARY OF THE INVENTION

It is therefore an object of the present invention to provide a suspension system which can suppress a toe-out trend in a braked turning operation of the vehicle to obtain a desirable stability in the braking operation of a vehicle.

It is another object of the present invention to provide a suspension system which can restrict a change in the toe direction of the wheel in a driven turning operation to obtain driving stability.

According to the present invention, the above and other objects of the invention can be accomplished through the provision of a rear suspension system comprising a rear differential gear mechanism for transmitting a driving force to rear wheels through rear axles, a suspension support member for supporting the rear differential gear mechanism, a pair of front lateral links extending horizontally and transversely, and a pair of rear lateral links extending horizontally and transversely at rear positions of the front lateral links respectively, the inner end of each of the lateral links being swingably connected to the suspension support member and the outer end of each of the lateral links being connected to a wheel carrier for carrying the wheel, characterized in that the suspension system further comprises elastic means mounted between a vehicle body and the suspension support member, the elastic means having respective load-deformation properties for an upward and downward deformations.

According to the present invention, the suspension support member is carried by a vehicle body through elastic means. On the support member mounted are inner ends of the front and rear lateral links respectively. The lateral links extend transversely and horizontally to be connected at the outer ends respectively with the wheel carrier for carring the wheel.

When the vehicle is in a braked running operation in which an engine brake is operated during running, rotation of the drive wheel is restricted so that a counterforce from the road surface acts on the wheel in such a direction that the wheel is forced to rotate forwardly. The counterforce is transmitted from a rear axle for the wheel to the differential gear mechanism, specifically to a differential gear case and then to the suspension supporting member which supports the gear mechanism wherein the counterforce acts on the suspension support member through the differential gear case in such a manner that the suspension support member is dragged downwardly at the front side thereof with respect to the rotation axis of the differential gear mechanism for the rear axle. In the suspension system according to the present invention, when the elastic means mounted between the vehicle body and the suspension support member is subjected to a force in the direction as described above with regard to the braked operation, the elastic means exhibits enough elasticity to allow the suspension support member to produce a slightly rotating movement by displacing downwardly the front side thereof. As a result, when the braking force resulting from the operation of the engine brake is transmitted to the wheel, the inner end of front lateral link moves downwardly while the inner end of the rear lateral link moves upwardly because the inner ends of both the front and rear lateral links are connected to the suspension support member.

On the other hand, when the vehicle is in a driven running operation in which drive wheels are driven by a driving force generated by an engine, the driving force is transmitted from the wheels to the road surface. At the same time, a counterforce from the road surface acts on the wheels to oppose the rotation of the wheel. The counterforce is transmitted to the differential gear mechanism and then to the suspension supporting member which supports the gear mechanism wherein the counterforce acts on the suspension support member through the differential gear case in such a manner that the suspension support member is dragged downwardly at the rear side thereof with respect to the rotation axis of the differential gear mechanism for the rear axle. In other words, when the driving force from the engine is transmitted to the wheel, the suspension support member is forced so as to be moved in the opposite direction of the direction in the braked running operation, i.e. upwardly at the front side and downwardly at the rear side thereof.

However, in the case where the elastic means between the vehicle body and the suspension support member is subjected to a counterforce resulting from the driving force in the above direction, the elastic means exhibits a load-deformation property rigid enough to prevent a substantial movement of the suspension support member.

As a result, the amounts of movement of the inner ends of the lateral links are small.

When the vehicle is in a braked turning operation in which the engine brake is operated during a turning operation of the vehicle, the vehicle is bumped so that the vehicle body, including the suspension support member, is lowered relative to the outer wheel in the turning operation. As a result, the inner ends of both the front and rear lateral links which are connected to the suspension support member swing downwardly around the outer ends thereof. In this case, the amounts of movement of the inner ends of the front and rear lateral links are substantially the same. Since the front lateral link produces a swinging movement downwardly at the inner end by the counterforce against the driving force, the downward movement resulting from the bumping action in the turning operation results in an increase of the amount of the downward movement of the inner end of the front lateral link.

On the other hand, the inner end of the rear lateral link is moved upwardly at the inner end thereof when subjected to the counterforce resulting from the engine brake operation. The downward movement of the inner end of the rear lateral link in the bumping action of the turning operation is produced in such a direction that its upward movement resulting from the counterforce is negated.

It will be therefore understood that the amount of swinging movement around the outer end of the front lateral link is larger than that of the rear lateral link in the braked turning operation. As a result, the outer end of the front lateral link is moved transversely inwardly relative to the outer end of the rear lateral link so that the front side of the wheel is dragged inwardly relative to the front side thereof. Thus a toe-in movement is produced in the rear wheel under the braked turning operation of the vehicle.

On the other hand, when the vehicle is in a driven turning operation in which the vehicle is turning without the accompanying engine brake operation, the amount of movement of the suspension support member is restrained because the elastic means exhibits a sufficient hardness under such condition. In addition, since the amount of the downward movement of the inner ends of both the front and rear lateral links resulting from the bumping action is substantially the same, a toe direction change in the rear wheel can be restricted effectively.

According to the present invention, under the braked turning operation, a toe-out trend in the wheel can be suppressed to prevent an oversteer trend of the vehicle thereby obtaining driving stability.

Further, when the vehicle is in the driven turning operation, a toe direction change can be restricted to obtain a desirable steering stability.

The above and other features of the present invention will be apparent from the following description of preferred embodiments and reference to the accompanying drawings.

DESCRIPTION OF THE PREFERRED EMBODIMENTS

Figure 1:
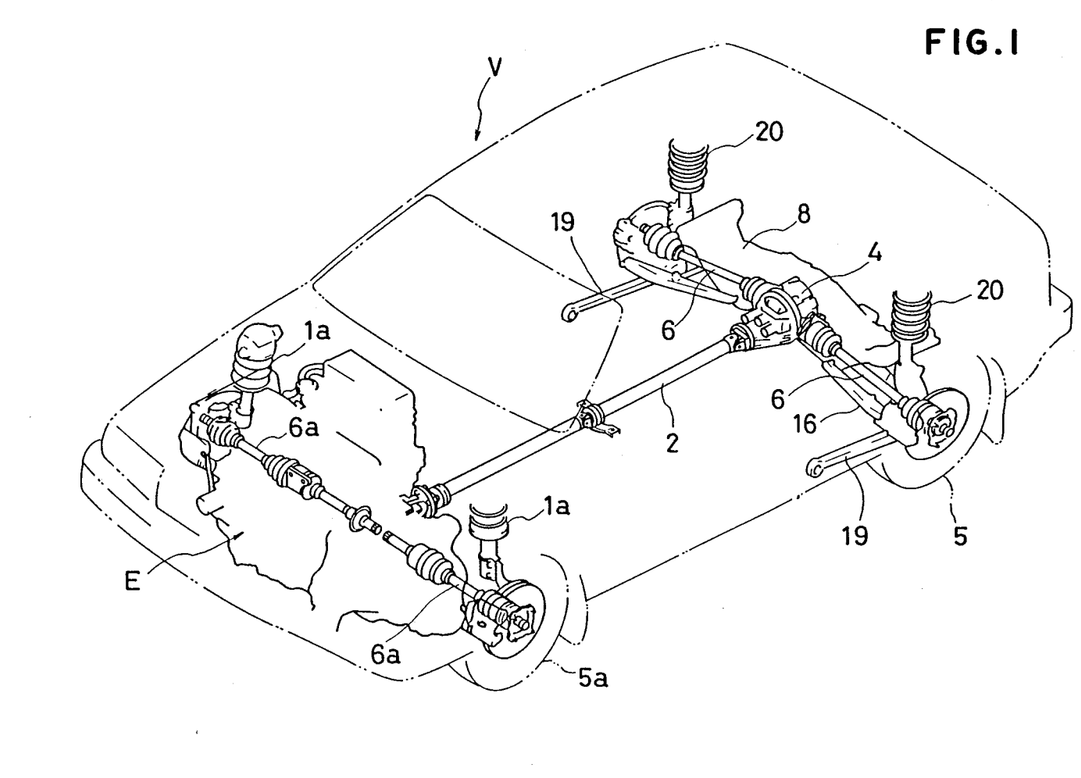
FIG. 1 is a schematic perspective view showing a four-wheel drive motor vehicle to which a suspension system in accordance with the present invention can be applied.
Figure 2:
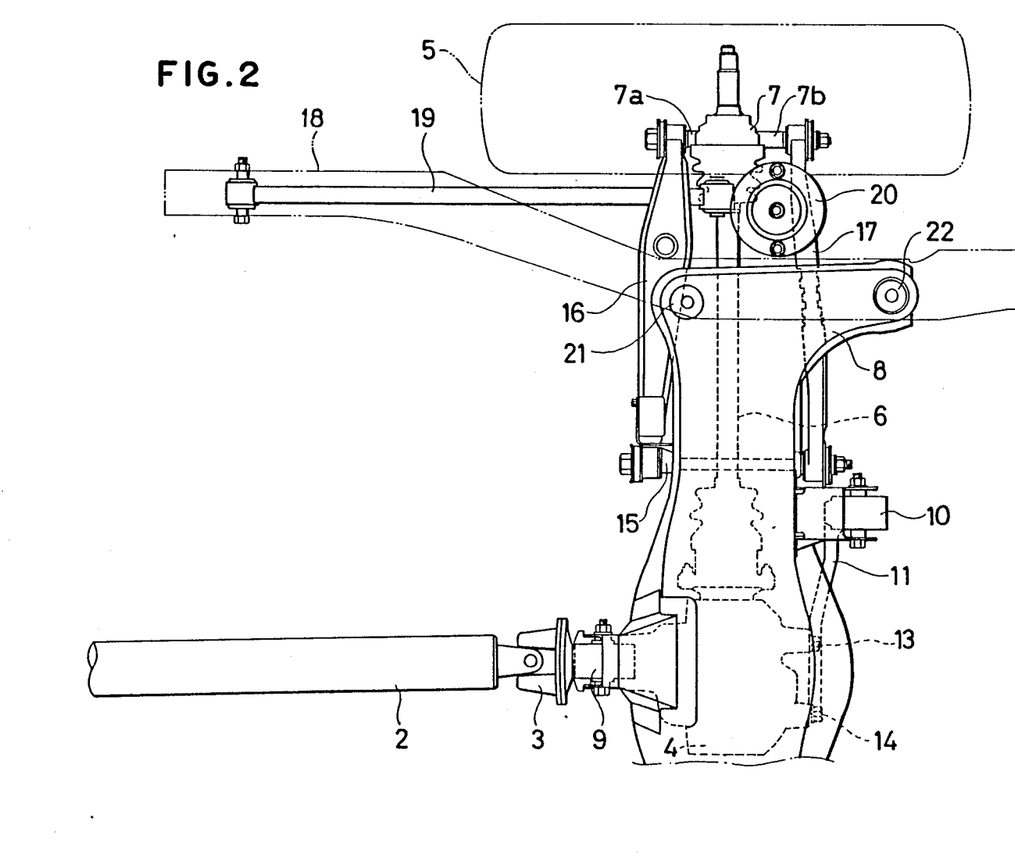
FIG. 2 is a plan view of a suspension system in accordance with present invention.

Referring to the drawings, particularly to FIG. 1, there is shown a motor vehicle V provided with a front suspension system 1a and a rear suspension system 1 according to the present invention. The illustrated motor vehicle V is of a four-wheel drive type and provided with an engine E at the front side thereof and front wheels 5a connected to front axles 6a. Referring additionally to FIG. 2, the motor vehicle V is provided with a propeller shaft 2 connected to the engine E through a transmission (not shown) and extending rearwardly, and a differential gear mechanism (not shown) connected with the rear end of the propeller shaft 2 through a universal joint 3. The differential gear mechanism is covered by a differential gear case 4.

The differential gear mechanism is located at the intermediate position of a straight line connecting right and left rear wheels 5 (only the right wheel is shown). A rear axle 6 extending transversely is connected to the right rear wheel 5 through a wheel support member 7 for transmitting a driving force from the engine E to the wheel 5.

Over the differential gear case 4 and the axle 6, there is disposed a suspension support member or suspension cross member 8 extending in the transverse direction of the vehicle V. The cross member 8 is connected through an elastic device 9 with the differential gear case 4 at a front edge and transversely middle portion thereof. A bracket is connected with the rear edge portion of the cross member 8 through an elastic device 10. The bracket 11 is joined to the rear side of the gear case 4 by means of bolts 13 and 14. The elastic devices 9, 10 function as shock absorbers and have an elastic coefficient rigid enough to restrain a toe direction control effect. Thus, in the embodiment, the cross member 8 and the differential gear case 4 can move together as far as a suspension mechanism for the toe control is concerned.

A supporting rod 15 extending in the longitudinal direction of the vehicle is mounted on a lower end portion of the cross member 8 with the supporting rod being located just at the outer side of the elastic device 10. At the opposite ends of rod 15, front and rear lateral links 16 and 17 are swingably connected at the inner end portions thereof in the up and down direction. The outer end portions of the front and rear lateral links are swingably connected in the up and down direction with arm portions 7a and 7b formed on the wheel supporting member 7 respectively. Connected to the wheel supporting member 7 is a rear end portion of a link member 19 extending longitudinally and secured to a body frame 18 at a front end portion. Further, on the wheel supporting member 7 is mounted a lower end portion of a strut assembly 20.

In the above structure, the support or cross member 8 is secured to the vehicle body through a pair of front elastic devices 21 and a pair of rear elastic devices 22. The front elastic device is located at the front side of the rotation axis of the differential gear mechanism for the axle 6 while the rear elastic device 22 is located the rear side thereof.

Figure 3:
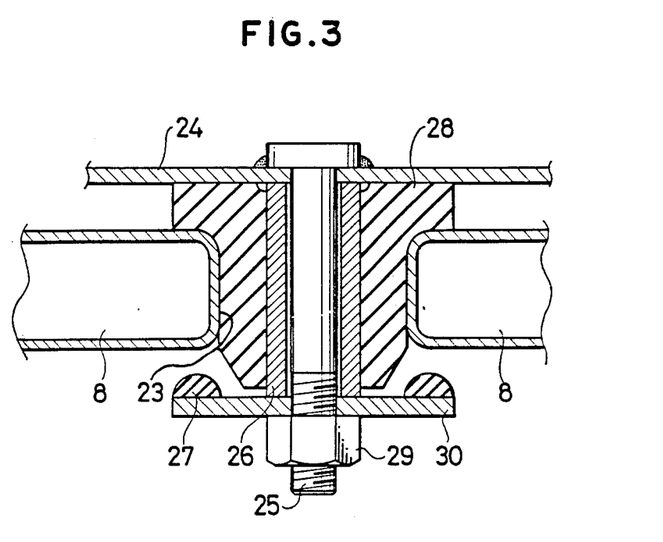
FIG. 3 is a sectional view of an elastic device employed for the present invention.

Referring to FIG. 3, there is shown a sectional view of the front elastic device 21.

The cross member 8 is constituted to form a closed cross section by a panel member. The cross member 8 is formed with a hole 23 on which the front elastic device 21 is mounted. A bolt 25 fixed to a body panel 24 at one end is inserted into a spacer 26 and extended through the hole 23. Bushes 27 and 28 are mounted around the spacer 26 and secured to the body panel 24 by a nut 29 through a plate member 30 wherein the cross member 8 is elastically carried by the bushes 28 so that the cross member 8 can be secured to the body panel 24 through the bushes 28. The bush 28 is formed at the upper end with a flange portion which intervenes between the body panel 24 and the cross member 8.

The flange portion of the bush 28 is pre-compressed when the bush 28 is assembled into the vehicle.

Figure 4:
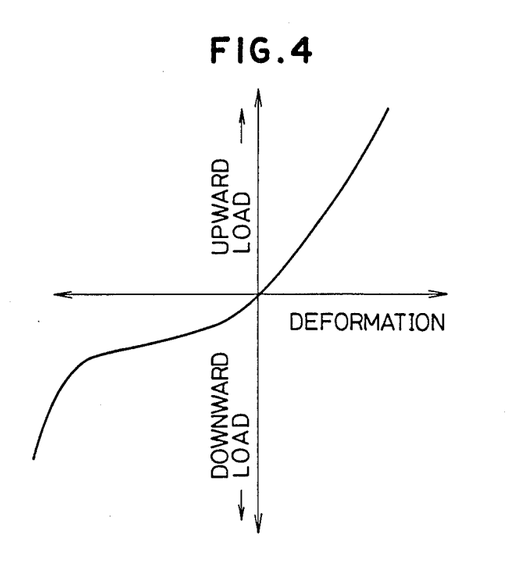
FIG. 4 is a graphical representation of a load-deformation property of the elastic device of FIG. 3.

It will be therefore understood that the elastic coefficient of the bush 28 is high when the bush deforms upwardly in FIG. 3. When the cross member 8 is forced to be moved upwardly in FIG. 3, a great force is needed until the bush 28 is released from the pre-compressed state thereof. Once the pre-load is removed from the bush 28, the cross member 8 can move easily. There is shown in FIG. 4 a relationship between the amount of the deformation of the elastic device 21, i.e. the movement of the cross member 8 and a load acting thereon.

Hereinafter there is described an operation of the suspension system of the illustrated embodiment.

Figure 5:
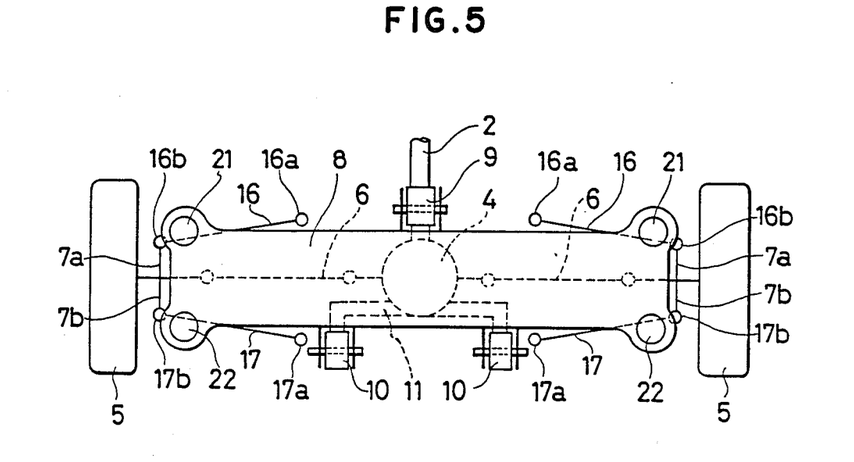
FIG. 5 is a plan view showing a skeleton of the suspension system of FIG. 2.
Figure 6:
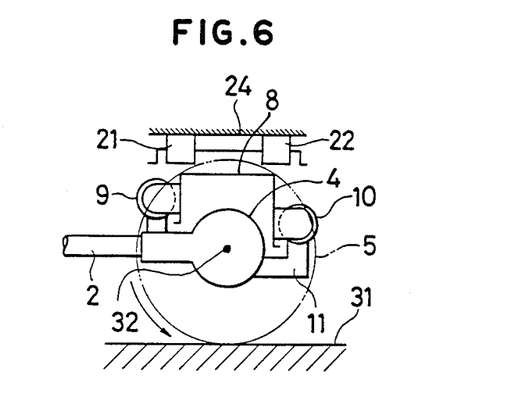
FIG. 6 is an elevational view of the suspension system of FIG. 6.

For convenience in explanation, FIGS. 5 and 6 are employed to show skeletons equivalent to the suspension mechanism shown in FIG. 2.

Referring to FIG. 5 and 6, when the vehicle is in a braked operation in which the engine brake is operated during running operation of the vehicle, the rear wheel 5 is subjected to a counterforce from a road surface 31 in the counterclockwise direction as shown in FIG. 6 by an arrow against a braking force. The counterforce is transmitted to the cross member 8 through the gear case 4 and the elastic device 9. As a result, the elastic device 21 mounted on the front side of the cross member 8 is subjected to a force from the cross member 8 in the downward direction while the rear elastic device 22 mounted on the rear side thereof is subjected to a force from the cross member 8 in the upward direction.

The elastic device 21 can be deformed easily when it is subjected to a force in the downward direction so that the cross member produces a swinging movement in such a manner that the front side thereof is moved downwardly while the rear side is moved upwardly.

Thus, the front and rear lateral links which are connected to the front side and the rear side of the cross member 8 at the inner end connections 16a and 17a move in different ways respectively. The connection 16a of the front lateral link 16 moves downwardly while the connection 17a of the rear lateral link 17 moves upwardly.

In a turning operation of the vehicle accompanying the braking force resulting from an operation of the engine brake, the outer side of the turning vehicle is bumped down so that the vehicle body is lowered against the wheel 5 of the outer side. As a result, the lateral links 16 and 17 swing downwardly around the outer end connections 16b and 17b.

In this case, the inner end connection 16a of the rear lateral link 16 is dragged downwardly in addition to the downward movement resulting from the counterforce against the braking force. To the contrary, the conterforce acts on the rear lateral link 17 to drag the inner end connection 17a upwardly in a direction which negated the downward movement of the inner end connection 17a resulting from the bumping action.

Therefore, the amount of the swinging movement of the rear lateral link 17 is smaller than that of the front lateral link 16. These different movements of the front and rear lateral links 16 and 17 cause the wheel 5 to produce a swinging movement in a horizontal plane, i.e. a toe direction change wherein the front side of wheel 5 moves inwardly relative to the rear side of thereof. In other words, the wheel 5 produces a toe-in movement.

As aforementioned, the bush 28 of the illustrated elastic device 21 is pre-compressed so that the deformation of the bush 28 is substantially restricted until the magnitude of the braking force reaches a predetermined value. Therefore, when the vehicle is under a driving condition in which the braking force acting on the wheel 5 is low, an abrupt toe-in movement is suppressed so that driving stability can be obtained. Then, when the braking force is increased more than the certain value, the toe-in trend is intensified so that safe drivability can be obtained.

On the other hand, when the vehicle is in the driven operation in which the wheels 5 are driven without an accompanying braking force, the counterforce from the road surface 31 acts on the wheel 5 in the clockwise direction in FIG. 6 as opposed to the braked operation.

Therefore the cross member 8 forces the front elastic device 21 upwardly and the rear elastic device 22 downwardly. It should be noted, however, that the front elastic device 21 does not allow a substantially upward movement of the cross member 8 and that the swinging movement of the front and lateral links 16 and 17 do not affect the toe-direction change in the wheel 5.

When the vehicle is in the driven turning operation in which the vehicle turns without being accompanied by the braking force, resulting from a bumping action, the vehicle body is lowered relative to the outer wheel 5 in the turning curve. However, there is no relative movement between the front and rear lateral links so that a substantial toe direction change in wheel 5 is not produced.

Accordingly, in the driven turning operation, a toe direction change can be restricted to be as low as possible so that a driving stability can be obtained.

Figure 7:
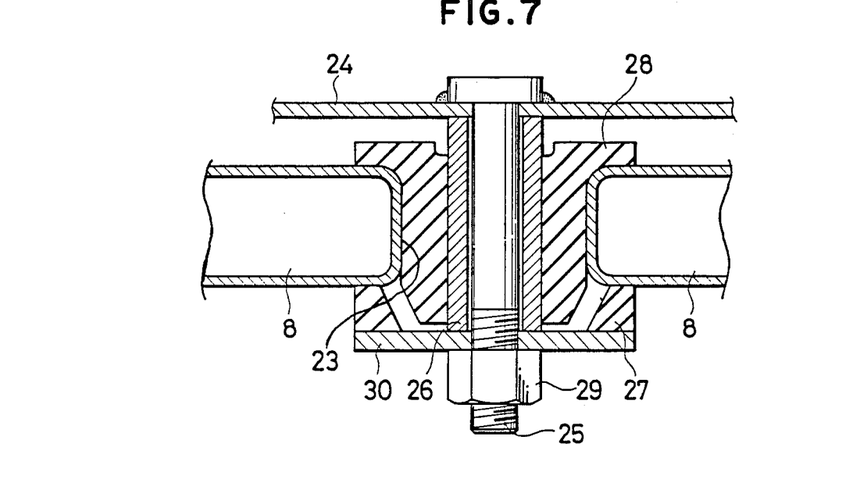
FIG. 7 is a sectional view showing another structure of an elastic device which may be employed for the present invention.

There is shown in FIG. 7 a sectional view of an elastic device. This elastic device has substantially the same structure as the front elastic device 21 as shown in FIG. 3 except that the elastic member 27 is pre-compressed between the plate member 30 and the cross member 8 and the flange portion of the elastic member 28 is spaced from the body panel 24. Therefore, in this structure, the cross member can be moved upwardly, but cannot be substantially moved downwardly. Thus the elastic device shown in FIG. 7 can be employed for the rear elastic device 22.

Figure 8:
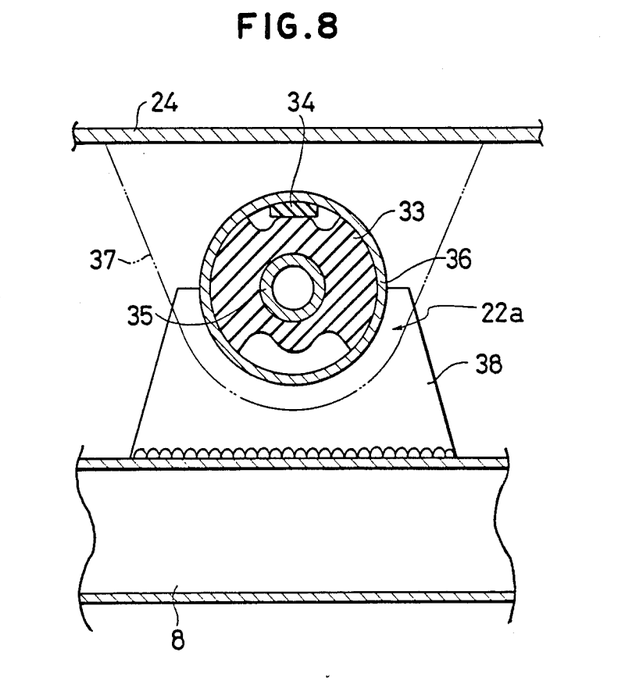
FIG. 8 is a sectional view showing still another structure of an elastic device which may be employed for the present invention.

There is shown in FIG. 8 an alternative elastic device 22a with a load-deformation property similar to the elastic device as shown in FIG. 7.

The illustrated elastic device 22a is provided with an elastic bushes 33 and 34 which are disposed in a space formed between tubular members 35 and 36. The tubular members 35 and 36 are located in a space formed between the body panel 24 and the cross member 8 and extend parallel to the panel 24 and cross member 8. The tubular members 35 and 36 are combined in a telescopic relationship with each other through the bushes 33 and 34. The inner tubular member 35 is carried by the body panel 24 through a bracket 37 and the outer tubular member 36 is carried by the cross member 8 through a bracket 38. The bush 33 is formed with cut-out portions at an upper and lower end portions. The bush 34 is inserted into the upper cut-out portion to be engaged with the outer tubular member 36 and the bush 33. The bush 34 is pre-compressed when mounted so that the cross member 8 can move easily when the upward force acting thereon exceeds the value of the pre-load causing the precompressive deformation of the bush 34.

On the other hand, the downward movement of the cross member 8 is substantially suppressed.

Figure 9:
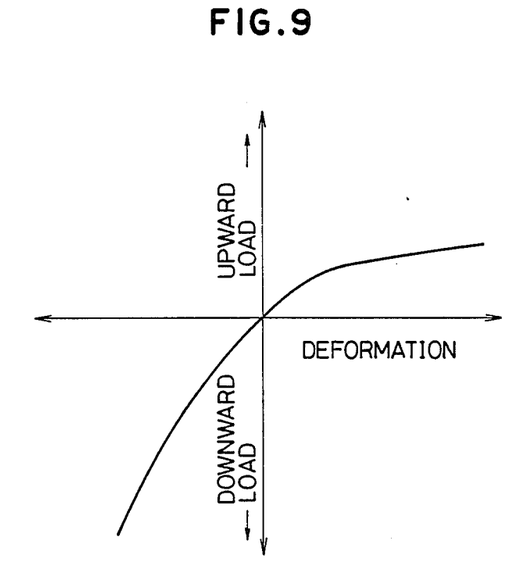
FIG. 9 is a graphical representation of a load-deformation property of the elastic device of FIG. 8.

As a result, the elastic device 22a shown in FIG. 8 can deform in accordance with a load-deformation property as shown in FIG. 9. Thus, the elastic device 22a shown in FIG. 9 can be employed for the suspension system in accordance with the present invention in lieu of the elastic device 22 shown in FIG. 7.

It should be noted that the vehicle is not necessarily provide selectively with the elastic device 21 in FIG. 3, the elastic device 22 in FIG. 7 or elastic device 22a in FIG. 8, but is provided with both the elastic device 21 in FIG. 3 for a front elastic device and the elastic device 22 in FIG. 7 or device 22a in FIG. 8 for a rear elastic device.

The invention has thus been shown and described with reference to specific embodiments. However, it should be noted that the invention is not limited to the details of the illustrated structures, and that changes and modifications may be made without departing from the scope of the appended claims.

I claim:

1. A rear suspension system for a motor vehicle comprising:

a rear differential gear mechanism for transmitting a driving force to rear wheels through rear axles, a suspension support member for supporting the rear differential gear mechanism, a pair of front lateral links extending substantially horizontally and transversely, a pair of rear lateral links extending substantially horizontally and transversely at positions to the rear of the front lateral links, an inner end of each of the lateral links being swingably connected to the suspension support member and an outer end of each of the lateral links being connected to a wheel carrier for carrying the wheel, and elastic means mounted between a vehicle body and the suspension support member, the elastic means having different load-deformation properties for upward and downward deformations, said elastic means having an elastic property such that the elastic means is softer when the suspension support member is forced to move downwardly at a front side and upwardly at a rear side of the suspension member than when the suspension support member is forced to move upwardly at the front side and downwardly at the rear side.

2. A rear suspension system in accordance with claim 1 in which a pair of the elastic means are disposed at the opposite ends of the suspension support member in a spaced relationship in the longitudinal direction of a vehicle.

3. A rear suspension system in accordance with claim 2 in which the elastic means are located opposite sides of a rotation axis of the differential gear mechanism respectively.

4. A rear suspension system in accordance with claim 3 in which the front and rear lateral links are disposed opposite sides of the rotation axis of the differential gear mechanism respectively.

5. A rear suspension system in accordance with claim 4 in which a pair of elastic means disposed at opposite ends and front portions of the suspension support member has such an elastic property that it is softer in the case where the suspension support member is forced to be moved downwardly at the front side and upwardly at the rear side than in the case where the suspension support member is forced to be moved upwardly at the front side and downwardly at the rear side.

6. A rear suspension system in accordance with claim 5 in which the elastic means comprises bolt means fixed to a vehicle body member and extending through a hole formed on the suspension support member, a set of elastic bushes disposed around the bolt means through spacer means for elastically carrying the suspension support member, plate means mounted on the bolt means for supporting the elastic bushes and nut means connected to the bolt means for carrying the elastic bushes between the body member and the suspension support member, one of the bushes being precompressed at a flange portion thereof intervened between the body member and the suspension support member.

7. A rear suspension system in accordance with claim 5 in which a pair of elastic means disposed at opposite end and rear portions of the suspension support member has such an elastic property that it is softer in the case where the suspension support member is forced to be moved downwardly at the front side and upwardly at the rear side than in the case where the suspension support member is forced to be moved upwardly at the front side and downwardly at the rear side.

8. A rear suspension system in accordance with claim 7 in which the elastic means comprises bolt means fixed to a vehicle body member and extending through a hole formed on the suspension support member, an elastic bush disposed around the bolt means through spacer means for elastically carrying the suspension support member, plate means mounted on the bolt means for supporting the elastic bushes and nut means connected to the bolt means for carrying the elastic bush between the body member and the suspension support member, one of the elastic buses intervened between the suspension support member being pre-compressed.

9. A rear suspension system in accordance with claim 7 in which the elastic means comprises outer tubular means connected to the suspension support member, inner tubular means disposed telescopically in the outer tubular means and connected to a vehicle body member, a first elastic bush with a pair of cut-out portions at opposite sides in the up and down direction intervened between the outer and inner tubular means for elastically carrying them, and a second elastic bush disposed in the upper cut-out portion of the first elastic bush so as to be engaged elastically with both the first elastic bush and the inner surface of the outer tubular means, the second elastic bush being pre-compressed.

10. A rear suspension system in accordance with claim 4 in which a pair of elastic means disposed at opposite end and rear portions of the suspension support member has such an elastic property that it is softer in the case where the suspension support member is forced to be moved downwardly at the front side and upwardly at the rear side than in the case where the suspension support member is forced to be moved upwardly at the front side and downwardly at the rear side.

11. A rear suspension system in accordance with claim 4 in which the differential gear mechanism is located at the center in the transverse direction of the vehicle.

12. A rear suspension system in accordance with claim 1 in which an engine is mounted on the front side of the vehicle.

13. A rear suspension system in accordance with claim 12 being adapted to apply to a four-wheel drive vehicle.

14. A rear suspension system for a motor vehicle comprising:
a rear differential gear mechanism for transmitting a driving force to rear wheels through rear axles,
a suspension support member for supporting the rear differential gear mechanism,
a pair of front lateral links extending substantially horizontally and transversely,
a pair of rear lateral links extending substantially horizontally and transversely at positions to the rear of the front lateral links, an inner end of each of the lateral links being swingably connected to the suspension support member and an outer end of each of the lateral links being connected to a wheel carrier for carrying the wheel, and
elastic means mounted between a vehicle body and the suspension support member, the elastic means having an elastic property such that the elastic means is softer when the elastic means is forced so as to be deformed by a braking force resulting from operation of an engine brake than when the elastic means is forced so as to be deformed by a driving force from an engine.

* * * * *

UNITED STATES PATENT AND TRADEMARK OFFICE
CERTIFICATE OF CORRECTION

PATENT NO. : 4,865,350

DATED : September 12, 1989

INVENTOR(S) : Yamamoto

It is certified that error appears in the above-identified patent and that said Letters Patent is hereby corrected as shown below:

On the title page item [21], change "175,162" to --173,162--.

Signed and Sealed this

Nineteenth Day of May, 1992

Attest:

DOUGLAS B. COMER

*Attesting Officer*   *Acting Commissioner of Patents and Trademarks*